GAGE & BECKWITH.
Grain-Drill.
No. 34,955. Patented Apr. 15, 1862.
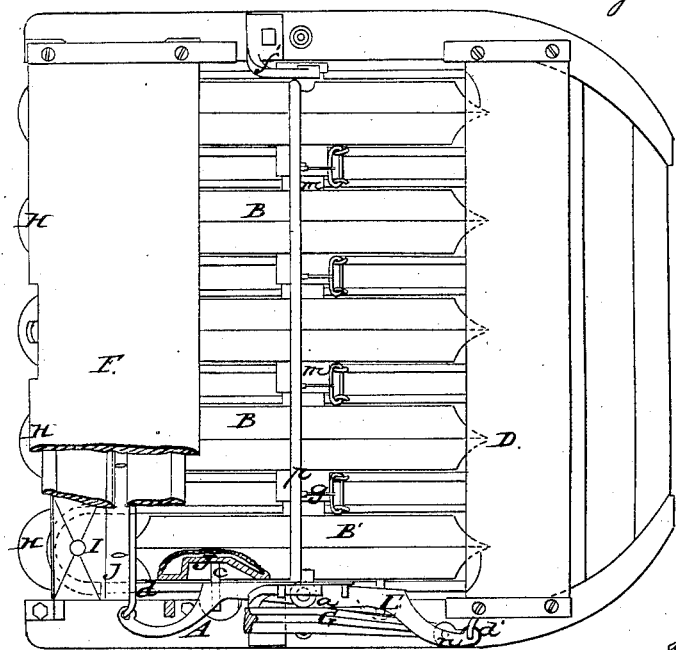
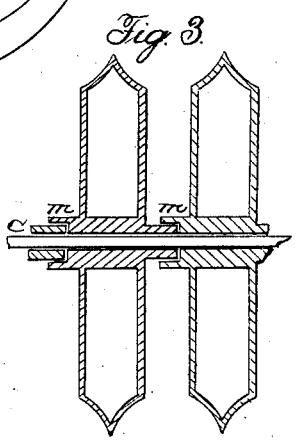
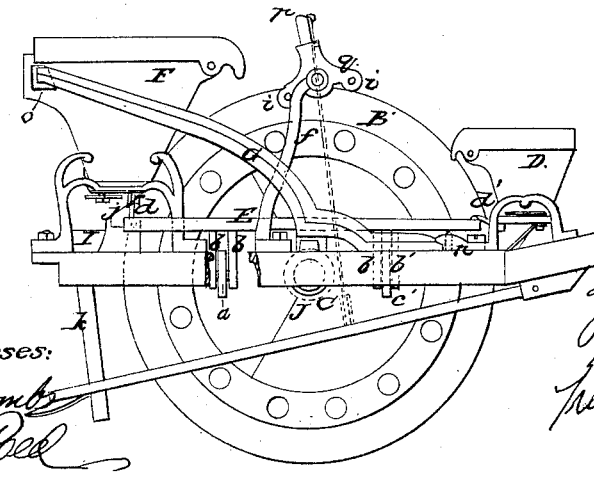

UNITED STATES PATENT OFFICE.

JOHN S. GAGE AND P. D. BECKWITH, OF DOWAGIAC, MICHIGAN.

IMPROVEMENT IN SEEDING-MACHINES.

Specification forming part of Letters Patent No. 34,955, dated April 15, 1862.

*To all whom it may concern:*

Be it known that we, JOHN S. GAGE and P. D. BECKWITH, both of Dowagiac, in the county of Cass and State of Michican, have invented a new and Improved Seeding-Machine; and we do hereby declare that the following is a full, clear, and exact description of the same, reference being had to the accompanying drawings, making a part of this specification, in which—

Figure 1 is a side elevation of our invention, and Fig. 2 is a plan of the same. Fig. 3 represents a transverse section of two of the wheels, showing the manner of fitting them together.

Similar letters of reference indicate corresponding parts in the two figures.

This invention is designed to be an improvement on the machine for which Letters Patent No. 29,071 were granted to John S. Gage; and it consists, first, in a novel device for throwing the seed-dropping apparatus in and out of gear.

It consists, secondly, in forming the ends of the hub of each furrow-wheel of unequal diameter and having the small end of one fitted to work in an annular recess in the large end of the hub of the adjoining wheel, whereby any dirt which may be lifted by the wheels is prevented from falling onto the bearings of the same, and a great saving thereby effected in the cost of keeping the machinery in repair and in the power required to operate the same.

To enable others skilled in the art fully to understand and construct our invention, we will proceed to describe it.

A represents a rectangular frame, which converges at its front end, and is mounted on a series of rollers or wheels, B, said wheels being of cast-iron, having V-shaped peripheries, and placed on an axle, C, which is journaled at each end in boxes attached to the under side of the frame, so as to have every other wheel revolve independently of the axle. The hub $m$ of each of these wheels is made larger on one side than the other, and is recessed to receive the small end of the hub of the adjoining wheel. By this means the bearing-surfaces of the hubs where they abut are protected against any falling dirt which may be carried up by the wheels while the machine is in operation, and thus what would otherwise prove a serious evil is effectually guarded against. The wheels, besides serving to support the frame and working parts of the machine, form the furrows in the ground for the grain.

Attached to the frame of the machine in front of the wheels B is a hopper, D, for grass-seed, and attached to the hind end of the frame is a similar hopper, F, though of larger size, for grain. Each of these hoppers is provided with the usual seed slides and agitators, which have a reciprocating motion imparted to them through the medium of the vibrating lever E by the cam or zigzag surface J of the outermost wheel, B, which is rigidly attached to the axle C. This vibrating lever E works on a fulcrum-pin, $a$, which is attached on the inner side to the lever G, and is thereby moved up to or from the cam-surface of the driving-wheel to throw the lever E, and through it the seed slides and agitators, in or out of gear.

Pendent from the vibrating lever E and opposite to the cam-surface of the driving-wheel are arms $b\ b$, between which are journaled friction-rollers $c\ c$, which, when the machine is in operation, alternately ascend and descend the inclinations of the cam-surface of the wheel, and thus impart through the vibrating lever E a reciprocating motion to the seed slides and agitators, they being connected to opposite ends of the lever, respectively, by rods $d\ d'$.

The lever G is fulcrumed to the frame at its front end by a pin, $n$, and at its back end is of curvated form, and extends to the upper back corner of the hopper, where it is provided with a latch, which works in a slotted plate, $o$, attached to or formed on the end of the hopper, and serves to hold the friction-rollers of the vibrating lever in contact with the cam-surface of the driving-wheel when it is desired to operate the seed-slides, and to prevent them from being spontaneously thrown out of gear when the machine is working.

H H are a series of coverers, one of which follows each of the wheels B, and is attached on opposite sides and in front thereof by a hinge-joint. The coverers are made in the shape of a half-moon, and are of little greater width than the wheels B.

Attached on opposite sides of the frame, and extending a little above the wheels in front of the axle C, are two brackets, $f\ f'$, in the upper extremities of which the ends of an offset crank-shaft, $p$, are fitted to turn freely. The coverers are attached to this crank-shaft between the wheels B, in front of the axle C, by rods $g$, which have each a loop at their lower end, which loop incloses two staples, attached respectively to two opposite sides of the hinged arms of two coverers. This mode of connecting the coverers with the crank-shaft allows them to rise and fall independently of each other and also of the crank. The crank serves to simultaneously raise or elevate all the coverers above the ground when it is desired to transport the machine to or from the field. Attached to one end of this crank-shaft is a T-head, $g$, which is provided with laterally-projecting pins $i\ i$, which, as the crank is turned up or down to raise or lower the coverers, are brought in contact with opposite sides of the arm, and the crank-shaft thereby prevented from turning beyond a certain position in either direction. The agitator $j$, beneath the grain-hopper, is inclined toward the hind end of the machine, and forms a chute to conduct the grain discharged from the hopper into downwardly-converging boxes I, from which the grain is conveyed into the furrow in the ground by flexible (or they may be inflexible) tubes $k$, which extend below the boxes nearly to the ground.

The operation is as follows: The boxes F D are supplied with the requisite seeds, and as the machine is drawn over the ground the seed slides and agitators, having a reciprocating motion imparted to them, as before described, cause the seed to run out of the apertures in the bottom of the hoppers from the hopper D directly onto the ground, where it is rolled in by the wheels B, which crush the clods and pulverize the earth, and at the same time form furrows to receive the grain, which is conveyed into them from the hopper F by the tubes $k$, when it is covered by the coverers.

The within-described machine is simple in its construction and very efficient, and leaves the ground in a good state or in a condition favorable for quick germination.

We do not claim any of the described parts separately or in themselves considered; but,

Having thus described our invention, what we do claim as new, and desire to secure by Letters Patent, is—

1. The lever G, slotted plate $o$, fulcrum-pin $a$, pin $n$, vibrating lever E, connecting-rods $d\ d$, friction-arms $b\ b$, friction-rollers $c\ c$, with the cam-surface J, and driving-wheel B', when combined and arranged to operate in the manner and for the purpose set forth.

2. Forming the ends of the hub $m$ of each furrow-wheel of unequal diameter, and having the small end of the hub of one wheel fitted to work within a recess in the large end of the hub of the adjoining wheel, in combination with the axle C, substantially as described, for the purpose set forth.

JOHN S. GAGE.
P. D. BECKWITH.

Witnesses:
STRAWTHER BOWLING,
JOHN H. OAKLEY.